(12) United States Patent
Scamarcio et al.

(10) Patent No.: US 11,085,441 B2
(45) Date of Patent: Aug. 10, 2021

(54) ELECTRIC GEAR PUMP

(71) Applicant: Robert Bosch GmbH, Stuttgart (DE)

(72) Inventors: Antonio Scamarcio, Massafra (IT); Nello Medoro, Trinitapoli (IT)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 16/468,050

(22) PCT Filed: Dec. 11, 2017

(86) PCT No.: PCT/EP2017/082189
§ 371 (c)(1),
(2) Date: Jun. 10, 2019

(87) PCT Pub. No.: WO2018/108796
PCT Pub. Date: Jun. 21, 2018

(65) Prior Publication Data
US 2019/0331112 A1 Oct. 31, 2019

(30) Foreign Application Priority Data
Dec. 12, 2016 (IT) .................. 102016000125212

(51) Int. Cl.
*F04C 2/10* (2006.01)
*F02M 63/02* (2006.01)
(Continued)

(52) U.S. Cl.
CPC ........... *F04C 2/102* (2013.01); *F02M 37/041* (2013.01); *F02M 37/08* (2013.01);
(Continued)

(58) Field of Classification Search
CPC .... F04C 2/102; F04C 11/008; F04C 15/0096; F04C 2240/808; F02M 37/041;
(Continued)

(56) References Cited

U.S. PATENT DOCUMENTS 6,179,596 B1 1/2001 Weisener et al.
2005/0201873 A1* 9/2005 Ogawa .................. F04B 39/06
417/366

(Continued)

FOREIGN PATENT DOCUMENTS

CN 2097295 U 2/1992
CN 2547910 Y 4/2003
(Continued)

OTHER PUBLICATIONS

Annotated Figure 4 of US 2008/0159885 (Kameya) (Year: 2021).*
International Search Report for Application No. PCT/EP2017/082189 dated Mar. 12, 2018 (3 pages).

*Primary Examiner* — Connor J Tremarche
(74) *Attorney, Agent, or Firm* — Michael Best & Friedrich LLP

(57) ABSTRACT

An electric gear pump comprising: a gerotor rotatable about an axis of rotation A; a support base for the gerotor; a cover which can be joined to the base; a feed duct and a delivery duct; electronic components of the control unit which are fastened on the outer surface of the cover; wherein the feed and delivery ducts are at least partly formed in the cover and comprise an axial section parallel to the axis A and a radial section parallel to the outer surface of the cover; wherein the outer surface of the cover comprises an inset portion; wherein at least a portion of the radial sections of the feed and delivery ducts is configured so as to project externally from the inset portion of the outer surface of the cover and form projecting support portions for the electronic components of the control unit.

12 Claims, 2 Drawing Sheets

(51) Int. Cl.
*F02M 37/08* (2006.01)
*F02M 37/04* (2006.01)
*F04C 15/00* (2006.01)
*F04C 11/00* (2006.01)
*H02K 5/22* (2006.01)
*H02K 11/33* (2016.01)

(52) U.S. Cl.
CPC ....... *F02M 63/0225* (2013.01); *F04C 11/008* (2013.01); *F04C 15/008* (2013.01); *F04C 15/0096* (2013.01); *H02K 5/225* (2013.01); *H02K 11/33* (2016.01); *F04C 2240/808* (2013.01)

(58) Field of Classification Search
CPC .... F02M 37/08; F02M 63/0225; H02K 5/225; H02K 11/33
See application file for complete search history.

(56) References Cited

U.S. PATENT DOCUMENTS

| | | | |
|---|---|---|---|
| 2008/0159885 A1* | 7/2008 | Kameya | F04C 2/102 417/410.4 |
| 2010/0130327 A1 | 5/2010 | Morgan | |
| 2010/0183454 A1 | 7/2010 | Lubke et al. | |
| 2010/0290934 A1 | 11/2010 | Hadar et al. | |
| 2012/0308414 A1* | 12/2012 | Ogawa | F04B 39/06 417/410.5 |
| 2013/0112174 A1* | 5/2013 | Krauss | F04C 14/02 123/504 |

FOREIGN PATENT DOCUMENTS

| | | |
|---|---|---|
| CN | 1534195 A | 10/2004 |
| CN | 102483059 A | 5/2012 |
| GB | 871822 A | 7/1961 |
| JP | 2005098268 | 4/2005 |
| JP | 2010150964 | 7/2010 |
| WO | 2014067545 | 5/2014 |

* cited by examiner

ELECTRIC GEAR PUMP

BACKGROUND OF THE INVENTION

The present invention relates to an electric gear pump. In particular the present invention relates to an electric gear pump of the gerotor type.

Furthermore, the present invention relates to a pump assembly comprising in series:
- a low-pressure pump (the aforementioned electric gear pump of the gerotor type), for drawing fuel, preferably diesel fuel, and for a first compression thereof; and
- a high-pressure pump, preferably of the pumping piston type, for a further compression of the fuel and for feeding the high-pressure fuel to an internal combustion engine.

Nowadays it is known to use systems for feeding fuel, in particular diesel fuel, to an internal combustion engine comprising a high-pressure pump, for feeding the internal combustion engine, and a low-pressure pump for feeding fuel to the high-pressure pump. The high-pressure pump comprises at least one pumping piston moved by a shaft and housed inside a cylinder fed with low-pressure fuel. At present there exist at least two different types of low-pressure pump for these systems.

The first type comprises a gear pump driven by the same shaft for driving the pistons of the high-pressure pump. In particular, this gear pump may be a "gerotor" pump. As is known, the gerotor pump comprises an externally toothed rotor rotated by the shaft and housed inside an internally toothed rotor. During rotation, the teeth of the externally toothed rotor engage with the teeth of the internally toothed rotor which has one more tooth than the externally toothed rotor. The two rotors, which rotate both in an absolute sense and relatively or one with respect to the other one, pump fuel from an inlet, which is connected to the tank, towards an outlet, which is connected to the high-pressure pump.

The second type of gear pump comprises gear pumps which are not driven by the shaft driving the pumping pistons, but pumps driven electrically or electromagnetically. According to this type of pump, at present in gerotor pumps at least one of the internally toothed rotor and the externally toothed rotor supports magnetic modules, such as stacks of iron laminations, which interact electromagnetically with a stator arranged on the outside of the internally toothed rotor and comprising electrical windings. When current is supplied to these windings electromagnetic conditions are created such that the gerotor starts to rotate performing the desired pumping action between the tank and the high-pressure pump.

In this type of gerotor electric gear pump, the stator provided with electrical windings, which may also be defined "electric motor" since it induces the movement of the gerotor, is situated on the same level as the gerotor in order to increase the electromagnetic interaction. This concentric arrangement of gerotor and stator today requires the presence of a bearing arranged between the outer wall of the internally toothed rotor of the gerotor and the stator. The gerotor electric gear pump comprises finally a support base for the gerotor and a cover which is joined to the base and inside which the fuel feed and delivery ducts are formed.

The electronic control of these gerotor electric gear pumps is assigned to an associated control unit. In particular, this control unit, which comprises a plurality of electronic components, is nowadays directly fastened to the cover of the gerotor gear pumps so as to be located in the vicinity of the feed and delivery channels and favour the transfer of heat from the electronic components to be cooled to the fuel passing inside the ducts.

In order to favour further this heat exchange, the feed and delivery ducts are configured so as to comprise an axial portion or section, namely parallel to the axis of the gerotor, and a radial portion or section, which extends parallel to the outer surface of the cover which supports the electronic components of the control unit.

In order to ensure a greater heat dispersion, the outer surface of the cover comprises reliefs which act as a support for the aforementioned electronic components.

SUMMARY OF THE INVENTION

Based on this known technology one object of the present invention is to provide an alternative gear pump, preferably an alternative gerotor electric gear pump.

In particular, it is an object of the present invention to provide a gerotor electric gear pump which is able to improve the corresponding pumps of the prior art mentioned above in a simple and low-cost manner from both a functional and a constructional point of view.

In accordance with these objects the present invention relates to an electric gear pump comprising:
- a gerotor rotatable about an axis of rotation A;
- a support base for the gerotor;
- a cover which can be joined to the base;
- a feed duct and a delivery duct;
- electronic components of the control unit fastened on the outer surface of the cover.

In particular:
- the feed and delivery ducts are at least partly formed in the cover and comprise an axial section parallel to the axis A and a radial section parallel to the outer surface of the cover;
- the outer surface of the cover comprises an inset portion;
- at least one portion of the radial sections of the feed and delivery ducts is configured so as to project externally from the inset portion of the outer surface of the cover and form projecting support portions for the electronic components of the control unit.

Advantageously, in this way, the distance between the electronic components to be cooled and the fuel through-flow ducts is reduced to the sole thickness of the outer wall of the channels projecting from the outer surface of the cover. This arrangement, contrary to that which occurs in the prior art where the cooling reliefs on the outer surface of the cover do not form part of the duct walls, allows a reduction in the axial volume of the gear pump and optimization of the heat flow between the electronic components to be cooled and fuel circulating inside the feed and delivery ducts. Obviously, the radial section of the ducts may also not be perfectly parallel, but may be slightly inclined relative to the outer surface of the cover.

According to a first embodiment of the invention, the fuel flow section of the feed and delivery ducts, in particular the edge close to the outer surface of the cover, is substantially flush with the inset portion of the outer surface of the cover from which it therefore projects only by the associated top covering portion.

Advantageously, in this way the cover has a high structural strength.

According to another embodiment of the invention, the fuel flow section of the feed and delivery ducts projects externally at least partly from the inset portion of the outer surface of the cover. According to this embodiment, therefore, the ducts project from the inset portion of the outer surface of the cover not only by the associated top covering portion, but also by at least a part of the side portion. In this embodiment the distance d between the electronic components to be cooled and the fuel passing inside the ducts is less than the projecting height h of the ducts with respect to the outer surface of the cover.

Advantageously, in this way the heat flow takes place along a greater heat-exchange portion.

In particular, according to the invention, the projecting portions of the ducts have a dome-like section in which the roof portion is preferably flat.

Advantageously, in this way, a stable flat fastening surface is provided for the electronic components to be cooled.

In particular, the outer surface of the cover comprises a raised perimetral edge in which the projecting portions of the ducts are flush with this raised perimetral edge.

Advantageously, in this way, a stable flat fastening surface is provided for the electronic components to be cooled, said surface extending beyond the projecting portions as far as the perimetral edge of the outer surface of the cover.

In particular, according to the invention, the outer surface has at least one projection or relief projecting with respect to the outer surface of the cover. This projection may project from the outer surface of the cover by a height less than or equal to that of the projecting portions and the raised perimetral edge.

Advantageously, in this way the dispersion of the heat is increased without adversely affecting the stable fastening of the electronic components on the projecting portions of the ducts.

Obviously the present invention includes, on the one hand, a pump assembly for feeding fuel from a tank to an internal combustion engine comprising in series an electric gear pump as described above and high-pressure pump and, on the other hand, the cover alone of the electric gear pump as a possible spare part able to improve the existing pumps in use.

BRIEF DESCRIPTION OF THE DRAWINGS

Further characteristic features and advantages of the present invention will become clear from the description below of a non-limiting example of embodiment, with reference to the figures of the attached drawings, in which.

DETAILED DESCRIPTION

Figure 1:
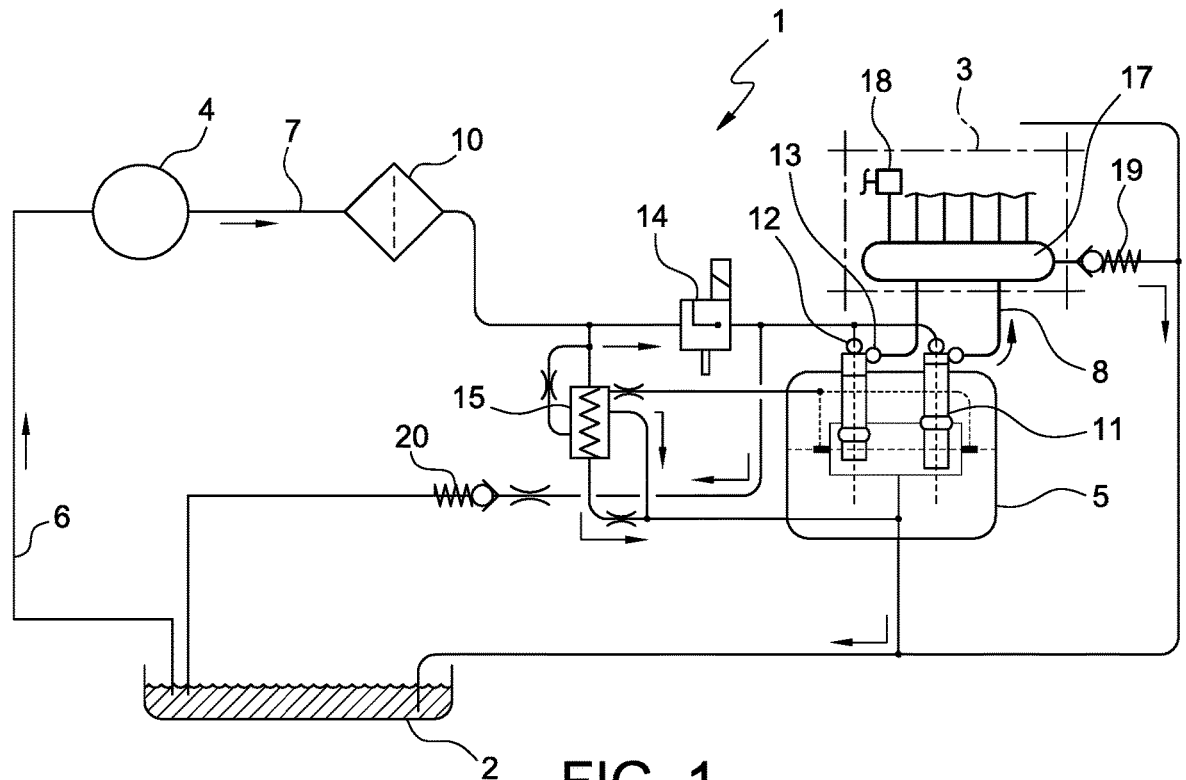
FIG. 1 is a schematic view of an example of a pump assembly for feeding fuel, preferably, diesel fuel, from a tank to an internal combustion engine, in which a low-pressure gear pump and a high-pressure pumping piston pump are arranged in series.

FIG. 1 is a schematic view of an example of a pump assembly for feeding fuel, preferably diesel fuel, from a tank to an internal combustion engine, in which a low-pressure pump and a high-pressure pump are arranged in series. In particular, FIG. 1 shows a pump assembly 1 comprising:
 a low-pressure electric gear pump 4;
 a high-pressure pump 5;
 a low-pressure intake duct 6 for feeding the fuel from the tank 2 to the electric gear pump 4;
 a low-pressure delivery duct 7 for feeding the fuel from the electric gear pump 4 to the high-pressure pump 5;
 high-pressure delivery ducts 8 for feeding the fuel from the high-pressure pump 5 to the internal combustion engine 3.

In this example the internal combustion engine 3 is shown only in schematic form and comprises a common header 17 fed by the high-pressure delivery ducts 8 and a plurality of injectors 18 configured to atomize and inject the high-pressure fuel into the cylinders of the internal combustion engine 3 (not shown). In FIG. 1 the high-pressure pump 5 is shown only in schematic form and comprises two pumping pistons 11 fed with the low-pressure fuel at feed valves 12 and connected to delivery valves 13 for feeding the high-pressure fuel to the engine 3. FIG. 1 further shows a filter 10 arranged downstream of the low-pressure pump 4, a fuel metering device 14 downstream of the filter 10, an overflow valve 15 between the filter 10 and the fuel metering device 14, a pressure limiting valve 19 connected to the header 17 and a delivery valve 20 connected to the tank 2. The arrows shown in FIG. 1 indicate the flow path of the fuel within the pump assembly 1.

Figure 2:
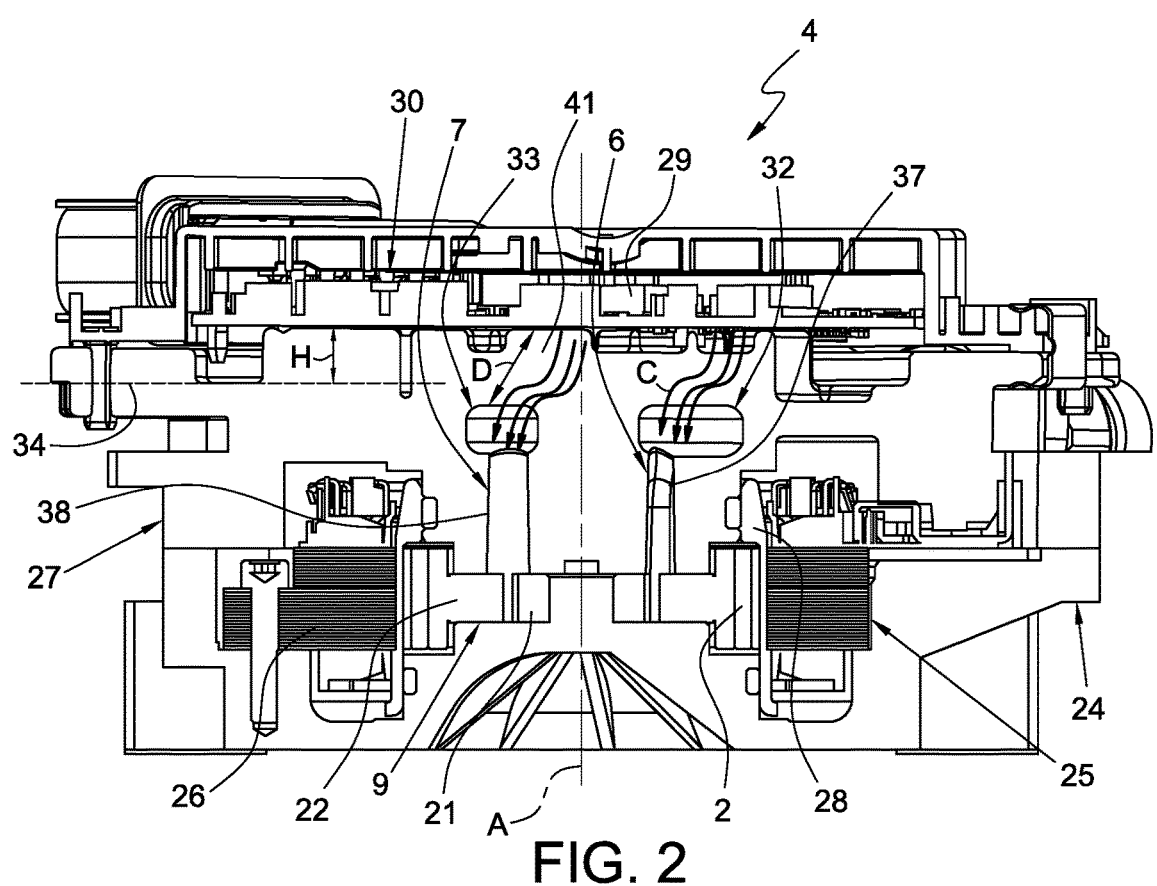
FIG. 2 shows a schematic view of a gerotor low-pressure gear pump according to the prior art.

FIG. 2 shows an electric gear pump 4 of the gerotor type according to the prior art. This electric gear pump 4 comprises:
 a gerotor 9 rotatable about an axis of rotation A, comprising an externally toothed rotor 21 and an internally toothed rotor 22 arranged on the outside of the externally toothed rotor 21;
 a stator 25 provided with electrical windings 26 and arranged on the outside of and on the same level as the gerotor 9.
 a support base 24 for the gerotor 9;
 a cover 27 which can be joined to the base 24 and in which the feed duct 6 and the delivery duct 7 are at least partly formed;
 electronic components 29 of the control unit 30 for the electric gear pump 4 which are fastened to the outer surface 31 of the cover 27 so as to release heat to the fuel passing inside the feed duct 6 and delivery duct 7.

For this purpose the feed duct 6 and delivery duct 7 comprise an axial section 37, 38 parallel to the axis of rotation A and a radial section 32, 33 orthogonal to the axis of rotation A and parallel to the outer surface 31 of the cover 27, which is preferably flat. As can be seen in FIG. 2, it is known to provide cooling reliefs 41 projecting from the outer surface 31 of the cover 27, in particular from its inset portion schematically indicated by the reference number 34 in FIG. 2. According to the prior art, the ducts 6, 7 are formed inside the cover 27 underneath this inset portion 34 without cooperating with the cooling reliefs 41.

As can be seen, the electronic components 29 of the control unit 30 to be cooled (which are only schematically shown) are fastened to the outer surface 31 of the cover 27 above the cooling reliefs 41.

In this configuration, therefore, the distance D between the electronic components 29 to be cooled and the fuel passing inside the ducts is greater than the height H of the reliefs 41 with respect to the inset portion 34 of the outer surface 31 of the cover 27. The heat, which is schematically indicated by the arrows C in FIG. 2, must therefore follow an ideal path greater than the height H of the reliefs 41 with respect to the inset portion 34 of the outer surface 31 of the cover 27.

Figure 3:
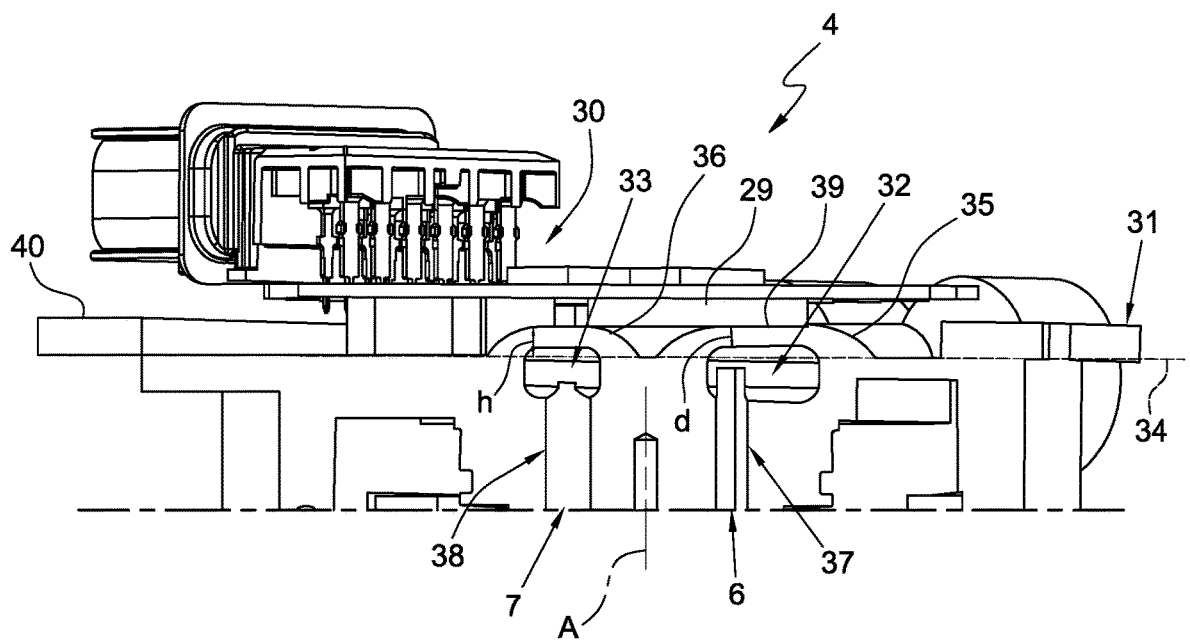
FIG. 3 shows a cross-sectional view of an example of embodiment of a gerotor low-pressure electric gear pump according to the present invention.

FIG. 3 shows a partial cross-sectional view of a gerotor low-pressure electric gear pump according to the present invention.

As can be readily seen, according to the invention the distance d which separates the electronic components 29 of the control unit 30 to be cooled and the fuel passing inside the radial sections 32, 33 of the feed duct 6 and the delivery duct 7 is the same as, or preferably smaller than, as shown in FIG. 3, the height h of the reliefs present on the inset portion 34 of the outer surface 31 of the cover 27. This configuration is achieved by incorporating the feed duct 6 and the delivery duct 7 inside the said cooling reliefs so that at least a portion of the radial sections 32, 33 projects externally from the inset portion 34 of the outer surface 31 of the cover 27 and forms projecting support portions 35, 36 for the electronic components 29 of the control unit 30.

Figure 4:
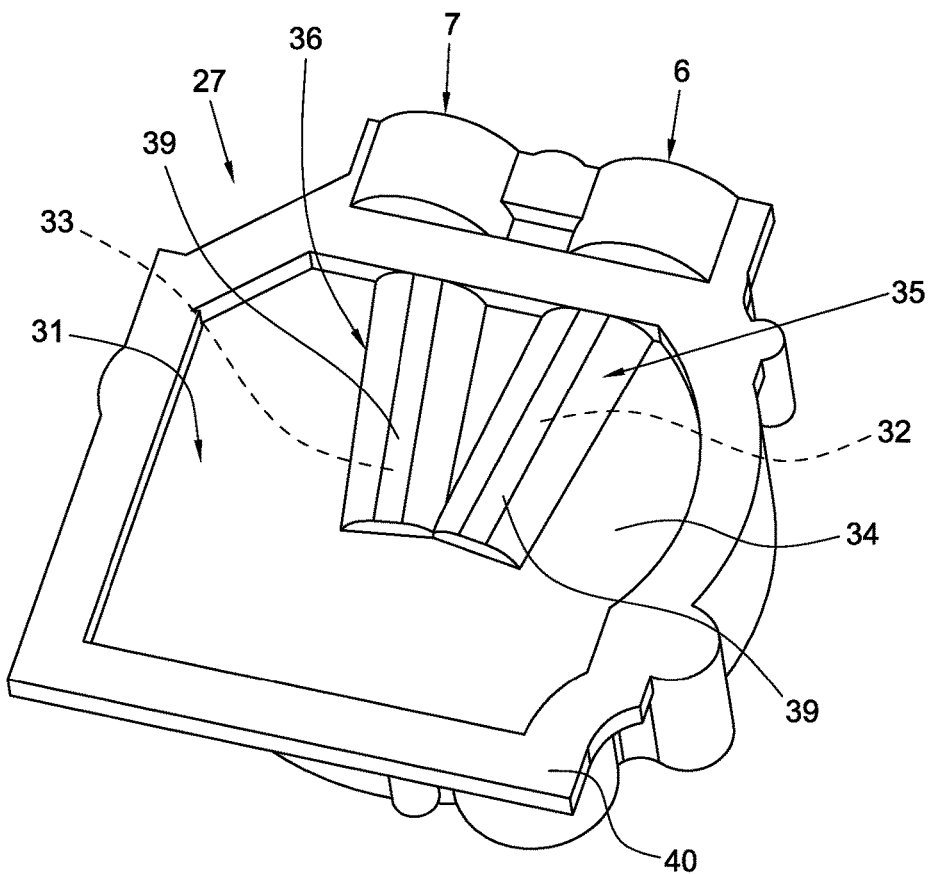
FIG. 4 shows a perspective view of the outer surface of the cover of the pump according to FIG. 3.

FIG. 4 shows a perspective view of the outer surface of the cover of the pump according to FIG. 3.

This figure shows how the ducts 6, 7, in particular the radial sections 32, 33, form the aforementioned projecting portions 35, 36. These projecting portions 35, 36, since they are simply formed by the thickness of the duct wall, have a dome-like section where the roof 39 is flat so as to facilitate supporting and engagement with the electronic components 29 of the control unit 30. The embodiment in FIG. 4 shows a raised outer edge 40 of the cover 27 which projects from the inset portion 34 of the outer surface 31 by the same height h as the aforementioned projecting portions 35 and 36.

Finally it is clear that the invention described here may be subject to modifications and variations without departing from the scope of the accompanying claims.

The invention claimed is:

1. An electric gear pump (4) comprising:
   a gerotor (9) rotatable about an axis of rotation (A);
   a support base (24) for the gerotor (9);
   a cover (27) joined to the support base (24), the cover (27) including an inner surface facing the gerotor (9) and an outer surface (31) opposite the inner surface and on an exterior of the gear pump (4);
   a feed duct (6) and a delivery duct (7); and
   electronic components (29) of a control unit (30) fastened on the outer surface (31) of the cover (27);
   wherein the feed duct (6) and the delivery duct (7) are at least partly formed in the cover (27) and each comprise an axial portion (37, 38) parallel to the axis (A) and an orthogonal portion (32, 33) orthogonal to the axis (A);
   wherein the outer surface (31) of the cover (27) comprises an inset portion (34);
   wherein each of the orthogonal portions (32, 33) of the feed duct (6) and of the delivery duct (7) has a portion which is configured so as to project externally from the inset portion (34) of the outer surface (31) of the cover (27) and which forms a projecting support portion (35, 36) for the electronic components (29) of the control unit (30),
   wherein the projecting support portions (35, 36) each have a dome-like section with a flat roof (39) configured to support the electronic components (29) of the control unit (30), and
   wherein the cover (27) has a raised perimetral edge (40) projecting from the inset portion (34) of the outer surface (31) by the same height (h) as the projecting support portions (35, 36).

2. The pump as claimed in claim 1, wherein a section of the feed duct (6) and the delivery duct (7) is flush with the inset portion (34) of the outer surface (31) of the cover (27).

3. The pump as claimed in claim 1, wherein the projecting support portions (35, 36) are flush with the raised perimetral edge (40).

4. The pump as claimed in claim 1, having at least one projection with respect to the outer surface (31) of the cover (27), and wherein the at least one projection projects from the outer surface (31) of the cover (27) by a height less than that of the projecting support portions (35, 36).

5. The pump as claimed in claim 1, having at least one projection with respect to the outer surface (31) of the cover (27), and wherein the at least one projection is flush with the projecting portions (35, 36).

6. A pump assembly for feeding fuel from a tank (2) to an internal combustion engine (3); the pump assembly (1) comprising in series a high-pressure pump (5) and a low-pressure electric gear pump (4) according to claim 1.

7. The pump as claimed in claim 1, wherein one of the projecting support portions (35, 36) extends in a first direction, and wherein another one of the projecting support portions (35, 36) extends in a second direction that intersects the first direction.

8. The pump as claimed in claim 1, wherein the inset portion (34) is substantially planar, and wherein the orthogonal portions (32, 33) are parallel to the inset portion (34).

9. The pump as claimed in claim 1, wherein the inset portion (34) is substantially planar.

10. The pump as claimed in claim 9, wherein the inset portion (34) is perpendicular to the axis (A).

11. The pump as claimed in claim 9, wherein the flat roofs (39) are parallel to the inset portion (34).

12. The pump as claimed in claim 1, wherein each of the orthogonal portions (32, 33) of the feed duct (6) and of the delivery duct (7) has another portion which is configured so as to project inward of the inset portion.

* * * * *